United States Patent [19]
Holt

[11] Patent Number: 5,076,539
[45] Date of Patent: Dec. 31, 1991

[54] TANK CAR BOTTON VALVE
[75] Inventor: Jan D. Holt, St. Charles, Mo.
[73] Assignee: ACF Industries, Incorporated, Earth City, Mo.
[21] Appl. No.: 709,203
[22] Filed: Jun. 3, 1991
[51] Int. Cl.$^5$ ............................................. F16K 51/00
[52] U.S. Cl. ..................................... 251/144; 251/78; 251/291
[58] Field of Search ................. 251/144, 78, 231, 291, 251/284

[56]  References Cited
U.S. PATENT DOCUMENTS

| | | | |
|---|---|---|---|
| 1,284,063 | 11/1918 | Davis, Jr. et al. | 251/144 |
| 1,749,119 | 3/1930 | Wilson | 251/144 |
| 3,420,495 | 1/1969 | Muehl | 251/144 |
| 3,656,710 | 4/1972 | Shaw | 251/144 |
| 4,194,523 | 3/1980 | Lubieniecki | 251/291 |
| 4,269,220 | 5/1981 | Rehbein | 251/144 |
| 4,280,679 | 7/1981 | Shaw | 251/144 |
| 4,312,373 | 1/1982 | Tilling et al. | 251/78 |

OTHER PUBLICATIONS

Midland Manufacturing Corporation, Bottom Outlet Valve, Drawing No. A-549 w/Installation and maintenance Instructions-11/15/78.

Primary Examiner—A. Michael Chambers
Attorney, Agent, or Firm—Polster, Lieder, Woodruff and Lucchesi

[57] ABSTRACT

A bottom outlet valve for a tank on a vehicle, especially for a railway tank car. The valve comprises a valve body including a valve seat, a valve stem spring biased toward the closed position against the seat and an operator assembly for mechanically opening and closing the valve stem. The operator assembly may be removed from the valve body in an improved facile manner by means of bolts all located exterior of the operator housing. A lost motion linkage allows the stem to seat under spring pressure even though the stem seals have become worn. The assembly has been uniquely designed to permit easier and safer installation and maintenance of the valve due in part to an improved stem cage assembly.

12 Claims, 3 Drawing Sheets

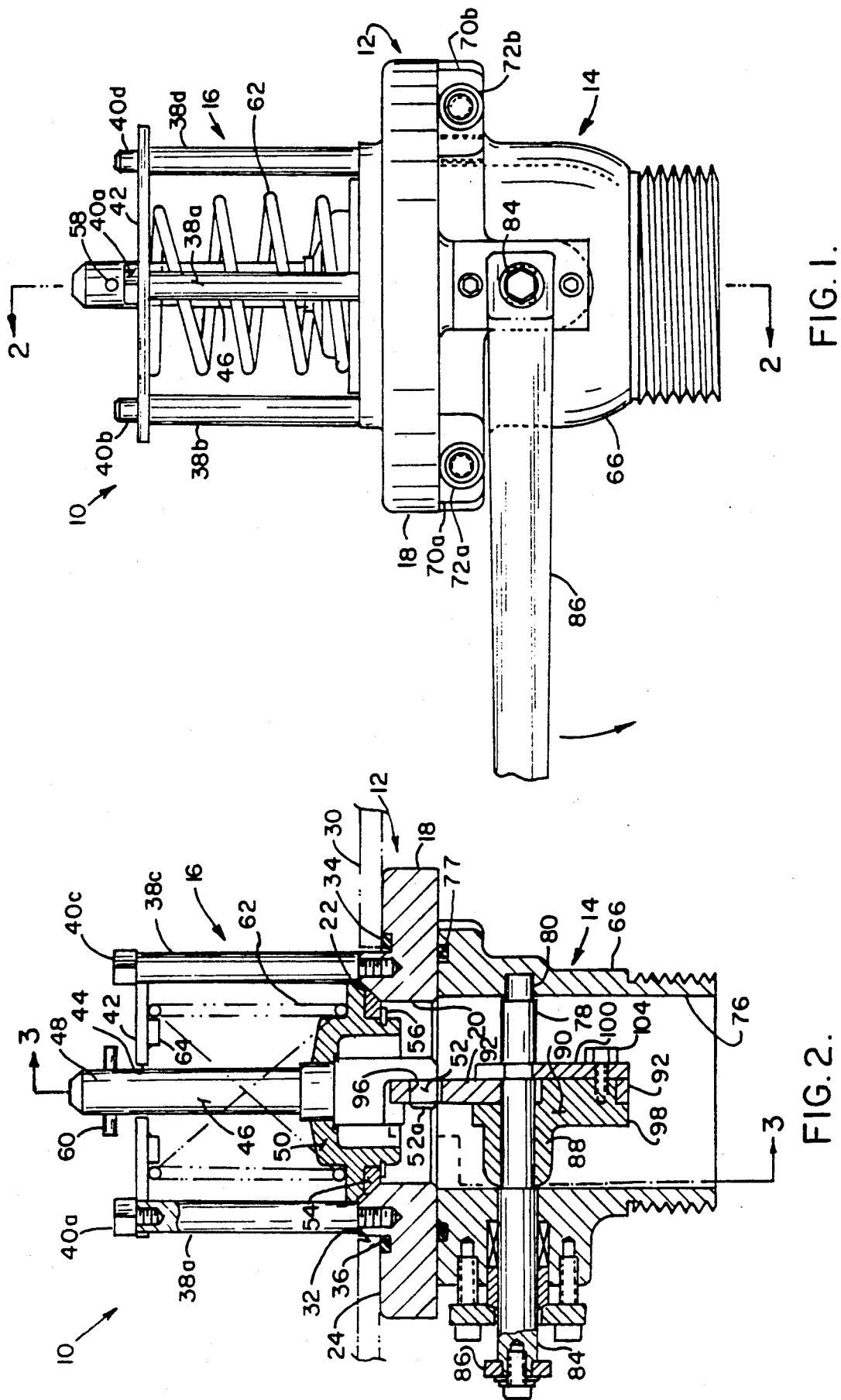

TANK CAR BOTTOM VALVE

BACKGROUND OF THE INVENTION

The present invention relates to a bottom operated outlet valve for a tank on a vehicle such as a tank on a railway tank car. Such valves are mounted on the underside of the tank and are in normal use opened and closed manually by operation of a valve handle located beneath the railway car. The handle is part of an operator assembly which by means of a mechanical linkage moves a valve stem toward or away from a valve seat. The operator assembly is connected to the underside of a valve body including the valve seat. Since the operator assembly extends down beneath the tank, it is possible that the operator assembly may collide with an immovable object. The prior art has recognized that in this eventuality it is important that the operator assembly purposely shear off the valve body without damaging the valve seat or the valve stem. A compression spring located inside the tank urges the valve stem to its closed position thereby alleviating the possibility of a spill of the tank car contents with possible large economic and environmental consequences.

The prior art outlet valves having bottom mounted operator assemblies and spring loaded valve stems have been difficult to install and maintain. Installation and removal of the operator assembly is complicated by the fact that the operator linkage inside the operator housing must be bolted to the underside of the valve stem while the quite heavy operator housing is held near the valve body, yet far enough away to reach inside between the valve body and operator housing. The operator housing can not be bolted to the valve body until after this precarious linkage to stem bolting procedure is accomplished. When the operator assembly is to be removed for repair or replacement of the valve, this difficult procedure oftentimes must be accomplished in reverse.

In the event that the valve stem seal or seat should become worn or deteriorated, the valve will leak since the linkage always holds the stem in a set position relative to the seat. The prior valve provides no means for the valve stem to compensate for this problem. Further, the design of the valve body of the prior art has made the replacement of valve stem seals relatively difficult and somewhat dangerous to accomplish, in that during removal of the valve stem the entire force of the valve stem compression spring must be released all at once. During reassembly the spring must be fully compressed before the spring can be mechanically locked in place. This causes great difficulty in locking the spring in place.

SUMMARY OF THE INVENTION

It is therefore an object of the present invention to provide a novel bottom operated tank valve which helps solve the above-mentioned problems of prior art valves; i.e. 1) to eliminate the necessity of bolting and unbolting the operator linkage to the valve stem during installation and maintenance procedures and to permit the removal of the operator assembly from the valve body by removing only bolts exterior of the operator housing; 2) to provide means to automatically compensate for stem seal or seat deterioration to thereby stop leaks, and 3) to allow easier and safer maintenance of the valve stem seal.

It is a further object of the invention to provide a bottom operated tank valve having a depending operator assembly which will more easily shear off the underside of the tank in a collision without disturbing the closure of the valve.

It is a still further object of the invention to utilize the valve stem compression spring in a dual role; not only to keep the valve closed after a collision, but also to automatically compensate for valve stem seal or valve seat deterioration.

Generally speaking, the novel valve includes a valve body having a valve seat. A valve stem within a stem cage is mounted on the upper side of the valve body and the stem is urged toward the valve seat by a compression spring located in the cage. A valve operator assembly is removably mounted in a facile manner to the underside of the valve body utilizing bolts located only on the outside of the operator housing. An operator shaft rotates an eccentric which reciprocates a link having an eye which is freely mated with a horizontal pin on the underside of the valve stem. This construction eliminates the necessity of manually bolting the two members within the housing. The diameter of the eye is greater than that of the pin to provide ease of connection, and a lost motion linkage between the pin and the eye allows the compression spring to urge the valve stem into sealing engagement with the valve seat even in the event that the stem seal has become deteriorated The stem cage includes a plurality of posts which may be easily removed from the valve body to permit convenient access to the valve stem seal and valve seat. The valve stem and the partially compressed spring are held together as a subassembly by a retainer member such that the entire spring pressure need not be released during maintenance and when the spring pressure is to be totally released it can be accomplished in two steps providing for a safe disassembly. This novel construction also allows for easier reassembly of the valve stem with the valve seat.

These as well as other objects and advantages of the present invention will become more apparent upon a reading of the following detailed description of a preferred embodiment thereof in conjunction with the drawings wherein:

BRIEF DESCRIPTION OF THE DRAWINGS

FIG. 1 is a front elevational view of a bottom operated tank outlet valve constructed according to the principles of the present invention;

FIG. 2 is a sectional view of the valve taken along reference line 2—2 of FIG. 1 with some parts shown in elevation for clarity;

DETAILED DESCRIPTION OF THE PREFERRED EMBODIMENT

Figure 3:
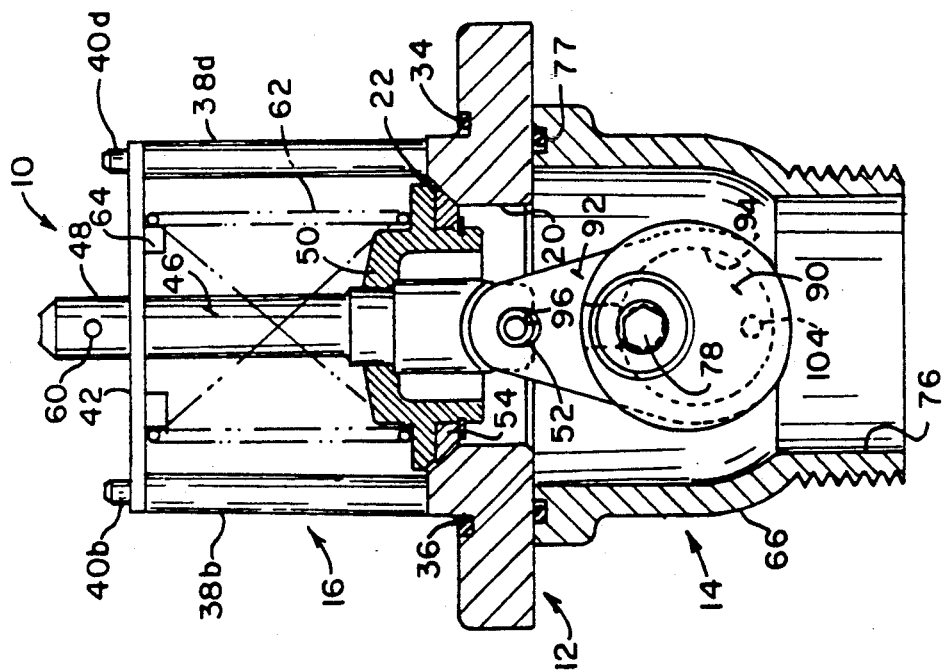
FIG. 3 is a sectional view of the valve taken along reference line 3—3 of FIG. 2 showing the valve stem in the closed position with some parts shown in elevation.

With reference to the drawings, there is shown a bottom operated railway tank car valve generally referred to by reference numeral 10. Valve 10 is comprised of a valve body 12, an operator assembly 14 depending from valve body 12 and a valve stem cage 16 mounted to the top of valve body 12.

Valve body 12 is comprised of a generally circular metal plate 18 having a central port 20. At the upper, inlet end of port 20 there is situated an outwardly angled annular valve seat 22. An outwardly extending annular flange 24 on plate 18 is provided with a plurality of circumferentially space holes 26 (FIG. 6) through which bolts 28 (FIG. 5) pass to affix valve body 12 to the underside of the lading tank of a railway tank car, tank truck or the like, 30 (FIG. 2). Valve body 12 is positioned such that port 20 communicates with the interior of the tank through bottom hole 32 of tank 30, and annular O-ring seal 34 positioned in annular groove 36 on the top surface of plate 18 presses against the underside of tank 30 under the pressure created by bolts 28 to provide a leak free seal between valve body 12 and tank 30.

Figures 5, 6:
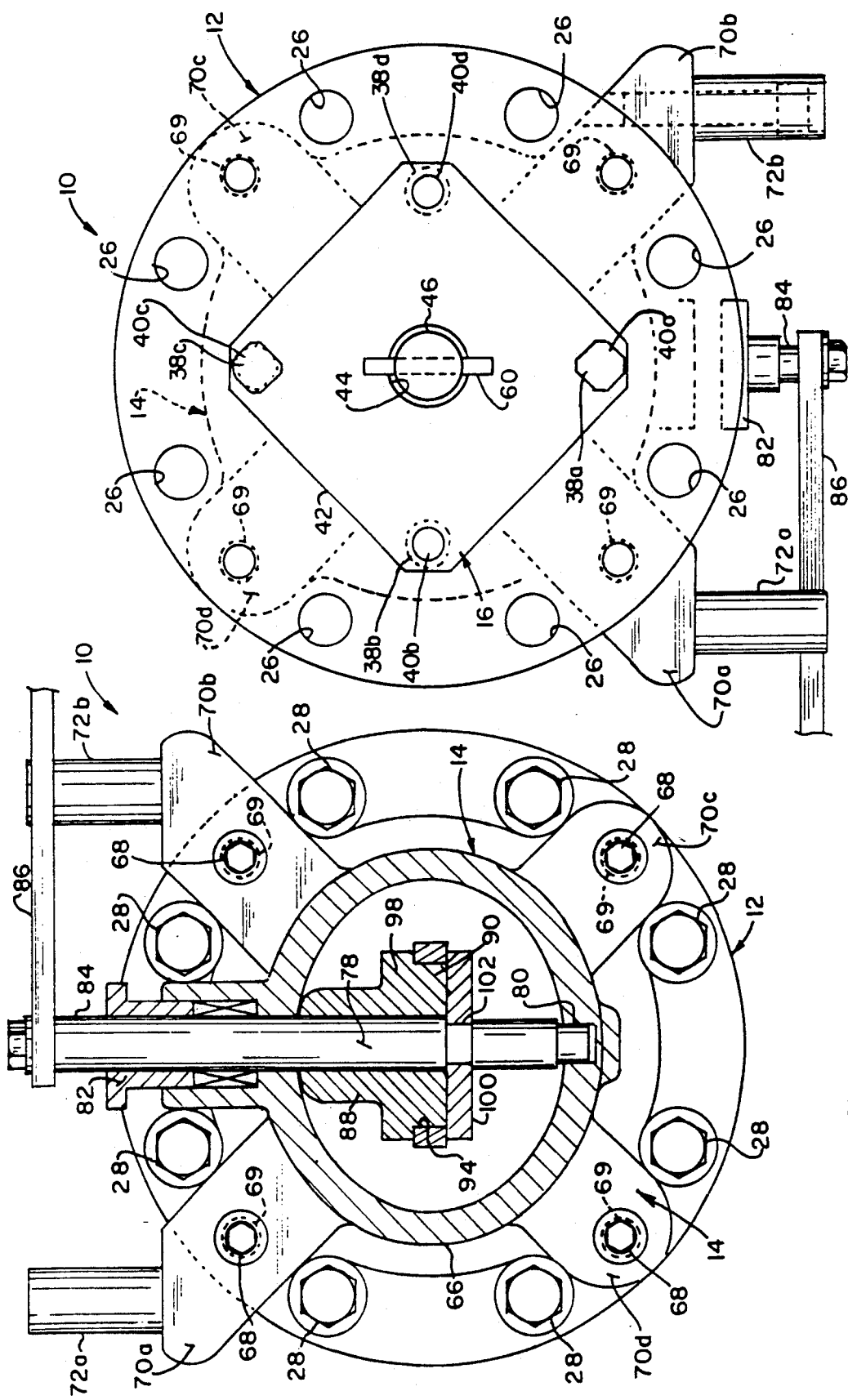
FIG. 5 is an enlarged sectional view taken along reference line 5—5 of FIG. 4 with some parts shown in plan.
FIG. 6 is an enlarged top plan view of the valve.

Valve stem cage 16 positioned on top of valve body 12 is comprised of four generally cylindrical posts 38a, 38b, 38c, 38d, best seen in FIGS. 1 and 6. Posts 38a, 38b, 38c, 38d are threadedly mated to the upper surface of valve body 12 at equal angular spaced intervals around valve seat 24 and extend upwardly into tank 30 through hole 32. In the preferred embodiment, diametrically opposed posts 38b and 38d terminate with central pins 40b and 40d, respectively of reduced diameter, while diametrically opposed posts 38a and 38c terminate with bolt heads 40a and 40c, respectively. While bolt head 40c may be permanently affixed to post 38c, bolt head 40a is threadingly mated with post 38a as shown in FIG. 2. It is noted that while all posts 38a, 38b, 38c, 38d, may be removable from valve body 12, it is necessary only that one of the posts 38c be removable from valve body 12 and only bolt head 40a be removable from post 38a, as will be explained hereinbelow.

Stem cage 16 also includes a generally square spring retainer plate 42 having four holes adjacent each respective corner which are in register with respective posts 38a, 38b, 38c, 38d. The holes in registry with posts 38a and 38c are relatively large to accept the full diameter of posts 38a and 38c, while the holes in registry with posts 38b and 38d are relatively small to accept only the reduced diameter pins 40b and 40d, respectively. In this manner retainer plate 42 is properly spaced from valve body 12 by posts 38b and 38d while it is held in position by bolt heads 40a and 40c on posts 38a and 38c, respectively. Retainer plate 42 also includes a central bore 44 through which extends valve stem 46. Valve stem 46 includes a central stem post 48 and an annular seal member 50 carried adjacent the lower end of post 48. As best seen in FIG. 2, at the lower extremity of post 48 below seal member 50, there is formed a hook like structure having a horizontally extending pin 52 having a free end 52a. Seal member 50 is shown to include an annular elastomer ring 54 positioned to seal with valve seat 22 and held in place by locking ring 56. At the top end of stem post 48 there is provided a horizontal bore 58 having a removable safety pin 60 snuggly fitted therethrough. Pin 60 is positioned a distance above retainer plate 42 even when valve stem 46 is down in the closed position as shown in FIG. 2. Between seal member 50 and retainer plate 42 there is located compression spring 62, best shown in FIG. 1, which constantly urges valve stem 46 with seal member 50 down toward the closed position. A spring positioning member 64 (FIG. 2) attached to the bottom of retainer plate 42 assures proper central positioning of spring 62.

Valve operator assembly 14 includes an operator housing 66 removably connected to the underside of valve body 12 by four external shear bolts 68 which pass through generally horizontal housing extensions 70a, 70b, 70c, 70d, (FIG. 5) through holes 69. Extensions 70a and 70b also carry outwardly extending handle stops 72a and 72b, respectively, for stoping the operating handle described later. Operator housing 66 also includes an outlet 76 in fluid communication with central port 20 of valve body 12. Annular O-ring seal 77 seals the juncture between operator housing 66 and valve body 12.

Operator housing 66 supports a transverse horizontal operator shaft 78 which extends from journal 80 formed within operator housing 66, diametrically across and through housing 66, through journal packing assembly 82 to a free external end 84. On free end 84 there is keyed lever handle 86 which may be pivoted in an arc on the underside of valve body 12 and is capable of rotating shaft 78 slightly more than one hundred eighty degrees.

Within operator housing 66, there is mounted on shaft 78 for rotation therewith an eccentric link 88 having a circular portion 90 with its center offset form the axis of rotation of shaft 78. Mounted on circular portion 90 of link 88 is a follower link 92 having a circular hole 94 sized to surround circular portion 90 and rotate thereon with respect thereto. At the opposite end of link 92 there is provided a circular hole or eye 96 with a diameter greater than that of pin 52 on valve stem 46 to loosely surround pin 52 and provide a lost motion linkage therebetween as will be further explained hereinbelow. Link 92 is held in registry with circular portion 90 of eccentric 88 by a flange 98 on eccentric 88 and by a generally horseshoe shaped key member 100 which slips into a groove 102 on shaft 78 and is there keyed to shaft 78. Key member 100 is then bolted to eccentric 88 by means of bolt 104. It can be seen that the assembly comprised of link 88 and key member 100 in groove 102 will prevent shaft 78 from being extruded through journal assembly 82 even under great liquid pressure which may exist in housing 66 during unloading of the liquid lading.

Figure 4:
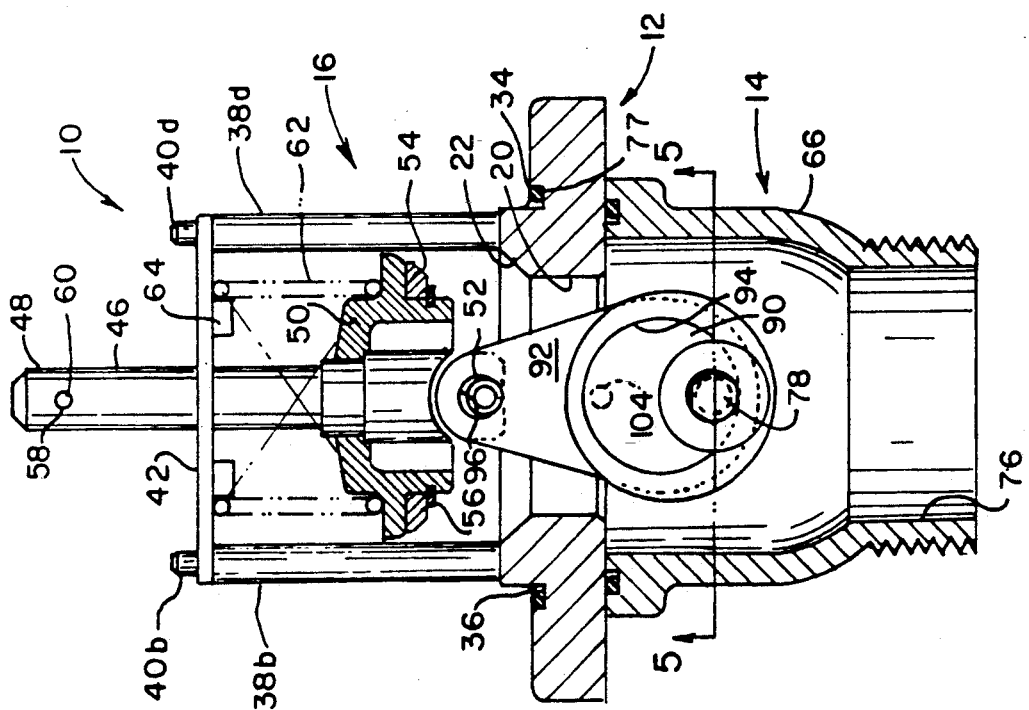
FIG. 4 is a sectional view of the valve similar to FIG. 3 showing the valve stem in the opened position.

In operation, assuming first that valve 10 is closed as shown in FIGS. 1, 2 and 3, handle 86 is rotated from stop 72a in the direction of the arrow in FIG. 1 just over one hundred eighty degrees to the position wherein it abuts stop 72b. This action rotates eccentric 88 about the axis of shaft 78 to the position of FIG. 4 wherein follower link 92 has moved up to push pin 52 and valve stem 46 up against spring 62, thereby unseating seal 54 from valve seat 22 and allowing liquid in the tank to flow out through port 20 and outlet 76 which has been fitted with a discharge hose (not shown). It is noted that handle 86 is pivoted slightly greater than one hundred eighty degrees to move link 92 slightly over center so that the downward pressure exerted on seal member 50 of stem 46 by spring 62 and the liquid pressure in the tank will force handle 86 against stop 72b. Therefore, valve stem 46 will not be forced down under these pressures. When valve 10 is to be closed handle 86 is rotated downwardly in an arc from stop 72b to stop 72a. This action first moves valve stem 46 up slightly and then stem 46 is mechanically pulled down by the downward, swiveling movement of link 92 and the interaction between eye 96 of link 92 and pin 52 of stem 46.

One of the advantages of valve 10 resides in the fact that an improved shear plane is created at the juncture between operator housing 66 and valve body 12. In the event depending operator housing 66 is struck in a collision, shear bolts 68 will break releasing housing 66 from valve body 12. Further, the force of the collision will, depending on the direction of the force of collision, either slip eye 96 of link 92 off pin 52 or simply break pin 52 off stem 46 thus completely releasing operator assembly 14 from the remaining structure and leaving seal member 50 intact to remain closed under the force of spring 62. Consequently, the liquid lading has an enhanced probability of remaining confined in the tank after a collision or derailment than has been the case with prior art valve structures.

Another advantage of valve 10 resides in improved installation and maintenance procedures. Since valve 10 may be very heavy, it is easier to mount and dismount the valve to and from the bottom of a tank in parts; i.e., the valve body 12 along with stem cage 16 separately from operator assembly 14. According to the present invention, this may be more easily accomplished. After valve body 12 carrying stem cage 16 is bolted to the underside of tank 30 by means of bolts 28, operator assembly 14 may be positioned separately beneath valve body 12 and slid horizontally such that pin 52 of stem 46 slides into eye 96 of link 92. Since eye 96 is oversized with respect to pin 52 this task is accomplished in a facile manner. Thereafter, shear bolts 68, all of which are located on the exterior of operator housing 66 are affixed and the mounting procedure is complete.

A still further advantage of valve 10 resides in the improved seating of stem seal 54 with valve seat 22. As best seen in FIGS. 2 and 3, normally valve stem 46 is held tightly closed by link 92. However, should seal 54 or seat 22 experience wear or other deterioration, spring 62 may push stem 46 down further to effect a better seal between seal 54 and seat 22. This is possible because of the fact that eye 96 is larger than pin 52, and pin 52 has room to move down within eye 96.

Another advantage of the novel structure of valve 10 is the ease and safety of valve stem seal and seat maintenance. Whether the valve is serviced from within the empty tank or is removed from the tank for servicing, the following advantages apply. In order to check, clean or replace stem seal 54 or clean seat 22, post 38c is unscrewed from valve body 12 and bolt head 40a is unscrewed from post 38a. This action releases retainer plate 42 and spring 62 will force plate 42 up against safety pin 60. It is important to note that if pin 60 were not provided retainer plate 42 might fly off under the considerable spring pressure and cause possible injury. Safety pin 60 allows for the release of only a portion of the spring pressure prior to full release of plate 42. Pin 60 may be retained in place and valve stem 46 tilted to release pin 52 from eye 96 of link 92. Valve stem 46 along with spring 62, plate 42 and pin 60 may be removed as a cartridge unit to allow servicing of stem seal 54 and seat 22. To reassemble the valve, valve stem 46 is tilted to hook pin 52 into eye 96 and retainer plate 42 positioned and aligned over posts 38a, 38b, and 38d. Bolt 40a and post 38c are then replaced and tightened while spring 62 is more easily and safely compressed due to the presence of pin 60.

It can thus be seen that the novel structure of valve 10 described in detail hereinabove fulfills the objects and provides the advantages of the invention set forth above. Inasmuch as numerous modifications may be made to the specific embodiment disclosed without departing from the spirit and scope of the invention, the scope of the invention is to be determined solely by language of the appended claims.

Having thus described the invention, what is claimed and desired to be secured by Letters Patent is:

1. A bottom valve for a tank on a vehicle comprising:
    a valve body adapted to be connected to the underside of the tank on a vehicle;
    said valve body including a valve seat surrounding an outlet;
    a valve stem cooperating with said valve seat to close said outlet when said valve stem is in a down position against said seat, and to open said outlet when said valve stem is in an up position away from said seat;
    a stem cage assembly mounted to the upper side of said valve body and adapted to extend into the tank;
    said stem cage assembly including spring means for urging said valve stem toward said down position;
    a valve operator assembly removably connected to the underside of said valve body;
    said valve operator assembly including an operator housing, and a rotatable operator shaft carried by said operator housing;
    said operator shaft carrying a link which moves up and down in response to rotation of said operator shaft, said link communicating with said valve stem to move said valve stem up against said spring means when said link moves up, and to move said valve stem down when said link moves down; and
    said link being freely moveable in a horizontal direction with respect to said stem when said operator assembly is disconnected from said valve housing and moved horizontally with respect to said valve housing.

2. The valve as specified in claim 1 and further comprising:
    one of said link and said stem including a pin and the other of said link and said stem including an eye, said pin having a free end freely slidable into and out of said eye; and
    said pin engaging said eye of said link for vertical movement therewith and said pin being free to move from within said eye in a horizontal direction when said operator assembly is disconnected from said valve body.

3. The valve specified in claim 2 and further comprising:
    said pin being generally horizontally disposed and generally cylindrical;
    said eye being generally circular; and
    the diameter of said eye being greater than the diameter of said pin to permit facile engagement and disengagement of said link from said stem and to permit additional downward movement of said stem with respect to said link from the normal closed position of said stem in the event of deterioration of said valve seat or valve stem.

4. The valve as specified in claim 1 and further comprising:
    said operator housing being connected to said valve body by a plurality of threaded bolts; and
    all of said bolts being accessible from the exterior of said operator housing such that removal of said bolts permits removal of said operator housing from said valve body without further removal of a bolt within said operator housing.

5. The valve as specified in claim 1 and further characterized by:
said shaft having keyed thereon an eccentric member, and said link being mounted on said eccentric member for movement therewith.

6. The valve as specified in claim 5 and further characterized by:
said eccentric member having an eccentric portion and a sleeve portion surrounding said shaft on one side of said link;
said shaft being grooved on the side opposite said one side of said link; and
a key member inserted within said groove and secured to said eccentric portion to prevent relative rotational movement between said eccentric and said shaft and to prevent pressured extrusion of said shaft from said operator housing.

7. The valve as specified in claim 1 and further comprising:
said stem cage assembly including a plurality of upstanding posts carried by said valve body and spaced around said valve stem;
a spring retainer member mounted on said posts;
a compression spring between said spring retainer member and said valve stem; and
at least one of said posts being removable from said valve body to provide access to said valve stem and facile servicing of said valve stem and said valve seat.

8. The valve as specified in claim 1 and further comprising:
said valve stem having a central vertical shaft terminating above said retainer member;
said retainer member being releasable vertically with respect to said valve body during servicing to at least partially release the compressive force of said spring; and
stop means removably carried by said valve stem above said retainer member for limiting upward movement of said retainer member while a portion of the compressive force of said spring is being released.

9. The valve as specified in claim 8 and further comprising:
a valve operator assembly mounted to the underside of said valve body;
said valve operator assembly including an operator housing and a rotatable operator shaft carried by said operator housing; and
said operator shaft carrying a link which moves up and down in response to rotation of said operator shaft, said link communicating with said valve stem to move said valve stem up against said spring means when said link moves up, and to move said valve stem down when said link moves down.

10. The valve as specified in claim 1 and further comprising:
said valve stem having a central vertical shaft terminating above said retainer member;
said retainer member being releasable vertically with respect to said valve body during servicing to at least partially release the compressive force of said spring; and
stop means removably carried by said valve stem above said retainer member for limiting upward movement of said retainer member while a portion of the compressive force of said spring is being released.

11. A bottom valve for a tank on a vehicle comprising:
a valve body adapted to be connected to the tank on a vehicle;
said valve body including a valve seat surrounding an outlet;
a valve stem cooperating with said valve seat to close said outlet when said valve stem is in a down position against said seat, and to open said outlet when said valve stem is in an up position away from said seat;
a stem cage assembly mounted to the upper side of said valve body and adapted to extend into the tank;
said stem cage assembly including spring means for urging said valve stem toward said down position;
a valve operator assembly mounted to the underside of said valve body;
said valve operator assembly including an operator housing, and a rotatable operator shaft carried by said operator housing;
said operator shaft carrying a link which moves up and down in response to rotation of said operator shaft, said link communicating with said valve stem to move said valve stem up against said spring means when said link moves up, and to move said valve stem down when said link moves down; and
means for permitting additional downward movement of said stem with respect to said link by said spring means when said stem is in the normal closed position to compensate for deterioration of said stem or seat, said means for permitting additional downward movement comprises a pin on one of said link and said stem and an eye in the other of said link and said stem, and said pin being relatively moveable within said eye in the vertical direction.

12. A bottom valve for a tank on a vehicle comprising:
a valve body adapted to be connected to the underside of the tank on a vehicle;
said valve body including a valve seat surrounding an outlet;
a valve stem cooperating with said valve seat to close said outlet when said valve stem is in a down position against said seat, and to open said outlet when said valve stem is in an up position away from said seat;
a plurality of upstanding separate posts carried by said valve body and spaced around said valve stem;
at least one of said posts being removable from said valve body;
a spring retainer member mounted on said posts;
a compression spring between said retainer member and said valve stem;
said valve stem being tiltable away from said valve seat upon the removal of a single one of said posts from said valve body in order to aid in servicing said valve stem.

* * * * *

UNITED STATES PATENT AND TRADEMARK OFFICE
CERTIFICATE OF CORRECTION

PATENT NO. : 5,076,539

DATED : December 31, 1991

INVENTOR(S) : JAN D. HOLT

It is certified that error appears in the above-identified patent and that said Letters Patent is hereby corrected as shown below:

Column 2, line 6, insert
--It is also an object of the invention to provide a bottom operated tank valve having a depending operator assembly which will more easily shear off the underside of the tank in a collision without disturbing the closure of the valve.--

Signed and Sealed this

Twentieth Day of April, 1993

Attest:

MICHAEL K. KIRK

Attesting Officer

Acting Commissioner of Patents and Trademarks